March 30, 1926.    1,579,184
A. WEILAND
SHOCK ABSORBER
Filed Feb. 26, 1924    4 Sheets-Sheet 2
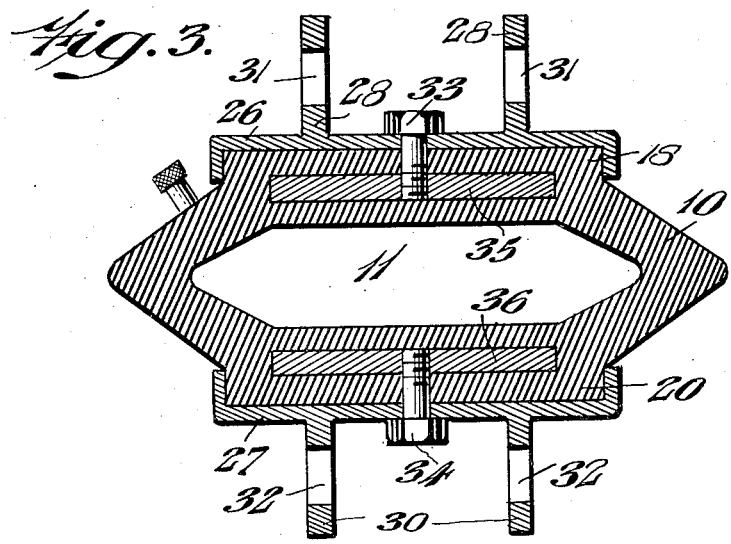
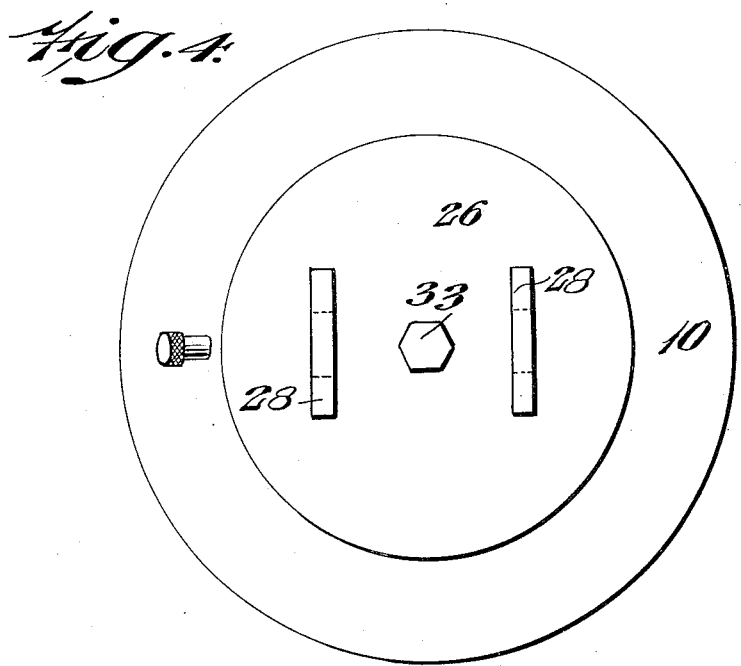
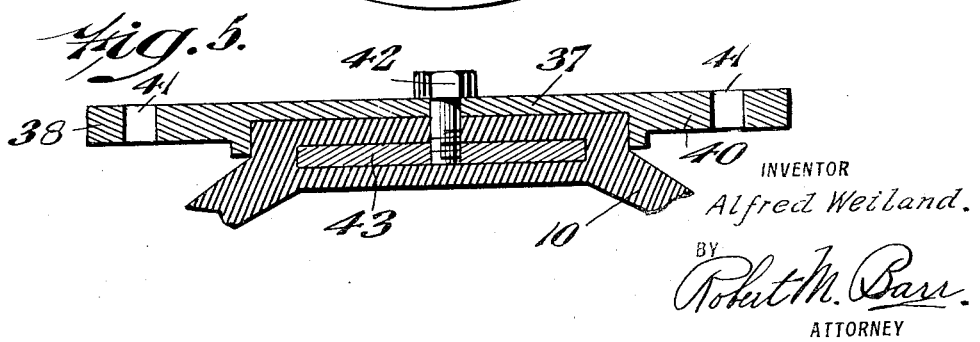
INVENTOR
Alfred Weiland.
BY
Robert M. Barr
ATTORNEY March 30, 1926.
A. WEILAND
1,579,184
SHOCK ABSORBER
Filed Feb. 26, 1924
4 Sheets-Sheet 3
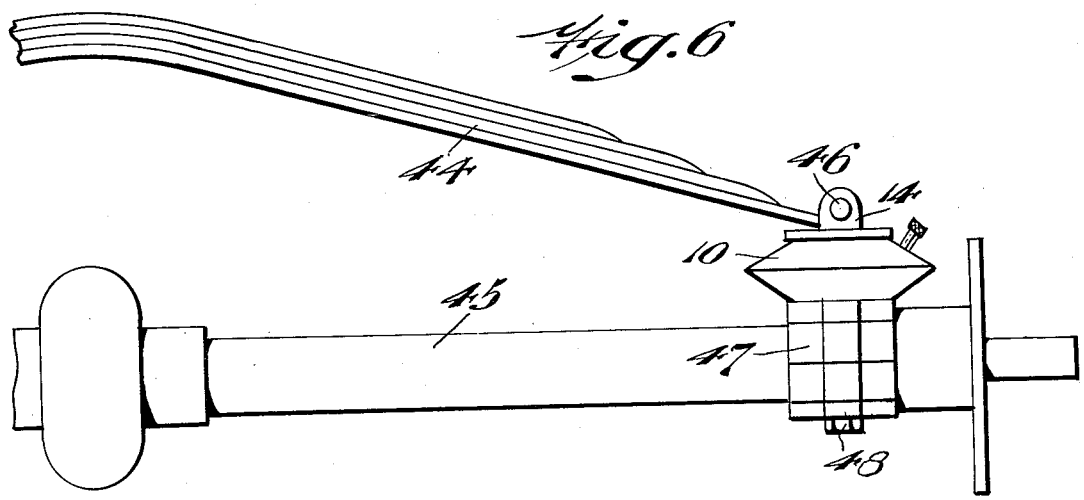
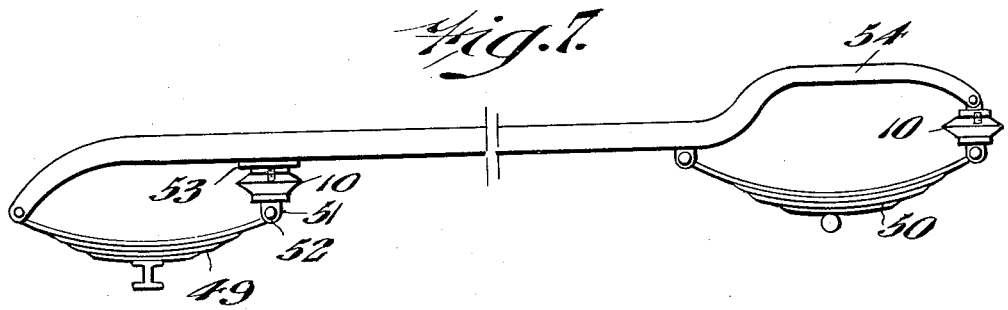
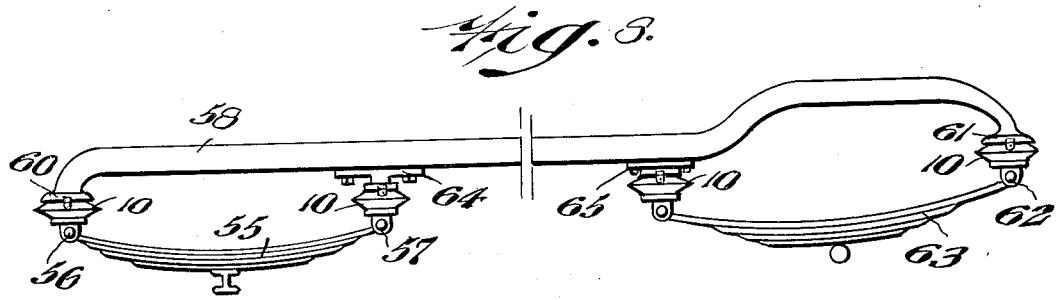
INVENTOR
Alfred Weiland.
BY Robert M. Barr.
ATTORNEY March 30, 1926.
A. WEILAND
SHOCK ABSORBER
Filed Feb. 26, 1924
1,579,184
4 Sheets-Sheet 4
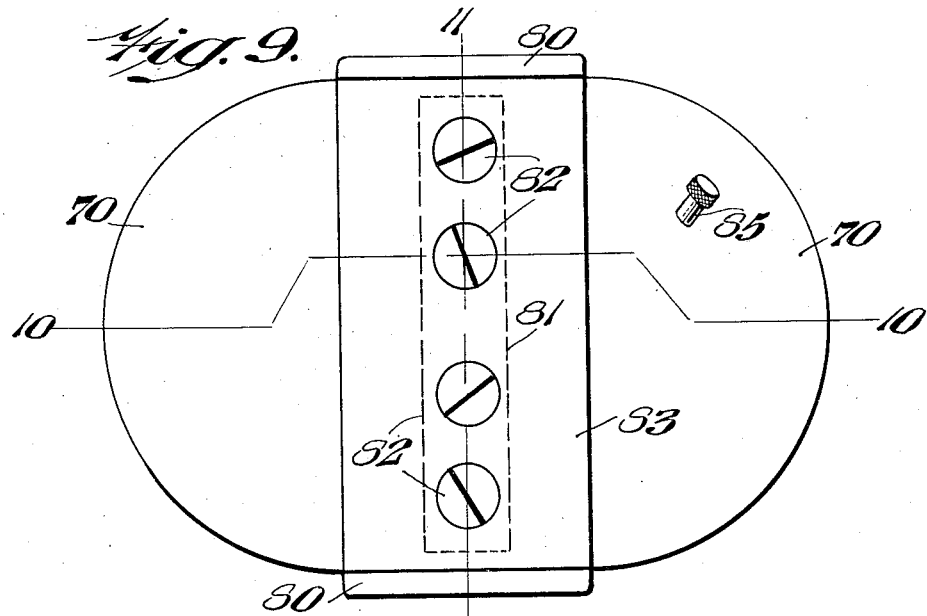
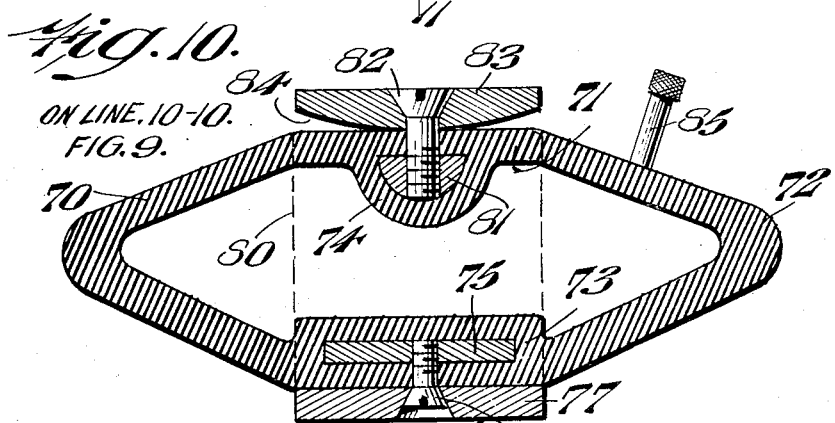
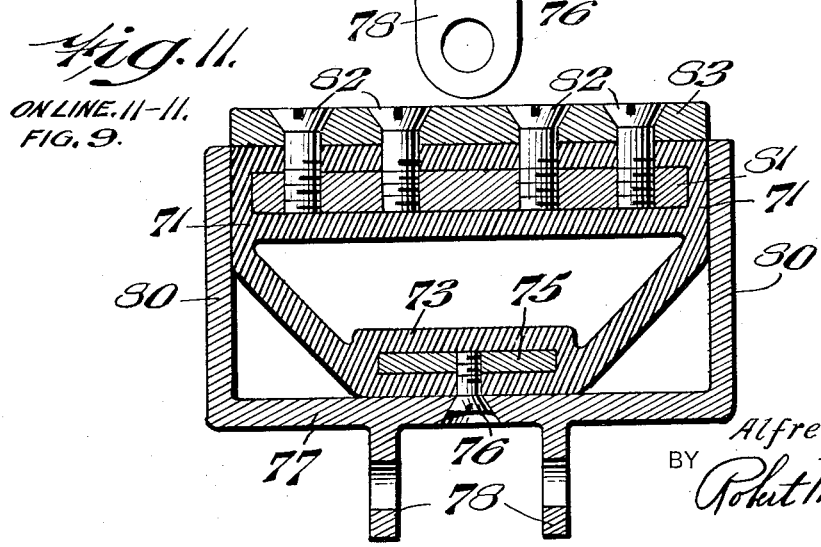
INVENTOR:
Alfred Weiland.
BY Robert M. Barr.
ATTORNEYS.

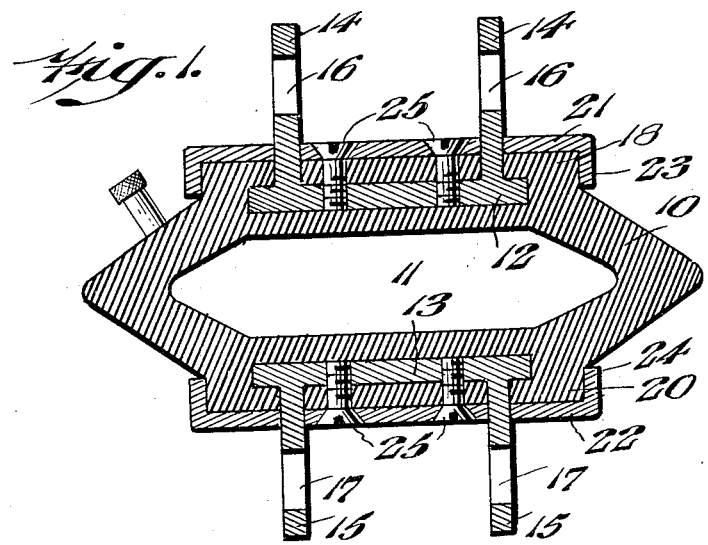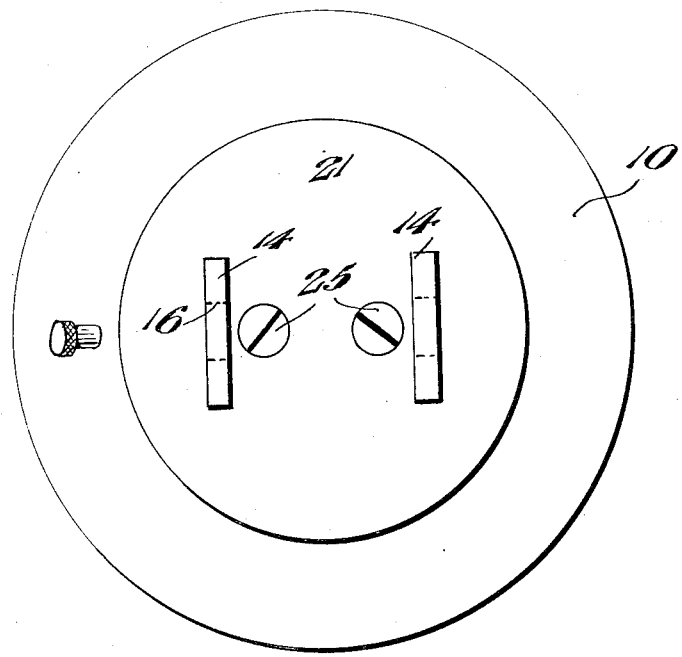

Patented Mar. 30, 1926.

1,579,184

UNITED STATES PATENT OFFICE.

ALFRED WEILAND, OF EAST ORANGE, NEW JERSEY.

SHOCK ABSORBER.

Application filed February 26, 1924. Serial No. 695,204.

*To all whom it may concern:*

Be it known that I, ALFRED WEILAND, a citizen of the United States, and a resident of East Orange, county of Essex, State of New Jersey, have invented certain new and useful Improvements in Shock Absorbers, of which the following is a specification.

The present invention relates to shock absorbers for motor vehicles, and more particularly to structural features of a shock absorber, such as described in pending application, Serial No. 631,977.

Some of the objects of the present invention are to provide a pneumatic compression member, the parts of which are so arranged and combined as to give the maximum neutralizing of a shock, and also to give the maximum strength and minimize side sway or lateral pressure under running conditions; to provide means operating in conjunction with the ordinary springs of a vehicle to support the load and reduce shocks caused by obstructions or irregularities of the road; to provide a construction wherein a shock absorber is provided which takes up or absorbs practically at the moment of occurrence the initial impact, so that the vehicle spring straightens out more gradually and comes to rest without rebound, and in this way eliminates the necessity of providing snubbers or other like appliances to overcome the return of the spring to its normal position; to provide a pneumatic shock absorber formed of a rubber body which functions in conjunction with air under pressure therein to support the weight of a vehicle; and to provide other improvements as will hereinafter appear.

In the accompanying drawings, Fig. 1 represents a sectional elevation of a shock absorber embodying one form of the present invention; Fig. 2 represents a plan of the shock absorber shown in Fig. 1; Fig. 3 represents a sectional elevation of a shock absorber embodying another structural form of the present invention; Fig. 4 represents a plan of Fig. 3; Fig. 5 represents a detail in section showing a form of attaching and holding plate for a shock absorber of the present invention; Fig. 6 represents an elevation of a portion of an axle and spring of a vehicle showing the shock absorber of the present invention applied to a spring which parallels an axle of a vehicle; Fig. 7 represents a detail in side elevation of a vehicle frame and springs showing the arrangement of the shock absorber of the present invention as applied to the front and rear springs of the vehicle; Fig. 8 represents a structure similar to Fig. 7, showing the shock absorber of the present invention as applied to both ends of each vehicle spring; Fig. 9 represents a plan of another form of the invention embodying side sway elminating features; Fig. 10 represents a section on line 10—10 of Fig. 9; and Fig. 11 represents a section on line 11—11 of Fig. 9.

Referring to the drawings, one form of the present invention is shown in Fig. 1 as comprising a pneumatic compression and expansion member 10, of rubber or other suitable flexible material, which in plan is of circular contour and in section of hollow construction with inwardly diverging side walls forming an interior chamber 11, into which air under pressure is introduced. In order to support the member 10 between a fixed part of the vehicle frame and the spring or movable part, and also to strengthen and reinforce the body of the rubber member 10, metal discs 12 and 13 are molded into the opposite ends of the member 10, and each has integrally formed therewith a pair of lugs 14 and 15, projecting from opposite ends of the member 10. The lugs 14 are respectively provided with openings 16 for the reception of a shackle bolt or other fastening means by which the lugs 14 are to be attached to the fixed part, while the lugs 15 have openings 17 respectively to receive a shackle bolt or other fastening means by which the lugs 15 are secured to the spring or movable element of the vehicle. It will thus be seen that when the member 10 is mounted between the fixed and movable parts of a vehicle by means of the lugs 14 and 15, any force acting upon the respective lugs will be transmitted to the respective discs 12 and 13 and there distributed throughout the body of the expansible member 10, and in this way the pneumatic element is not only greatly strengthened, but the force of impact is not so concentrated on the fabric of the pneumatic member as to cause it to tear or break at one point. In order to compensate for lateral stresses or forces acting in a direction to cause the member 10 to move in the direction of its horizontal axis, the inwardly diverging wall of the member 10 merges into two oppositely disposed cylindrical heads 18 and 20, which are respectively seated in cap plates 21 and 22, each arranged to fit snugly across the end of its enclosed head and about the sides thereof by means of the circumferential flanges 23 and 24. It will be understood that these plates 21 and 22 are respectively apertured for the passage of the respective fastening lugs 14 and 15. To secure the cap plates 21 and 22 rigidly to the member 10, stud screws 25 are provided which thread through respective head portions 18 and 20 of the member 10 and into the metal discs 12 and 13. In this way the cap plates are firmly united to the solid metal inserts of the rubber member, and as the screws 25 have their heads countersunk, the exterior appearance is neat and finished.

In the form of the invention shown in Fig. 3, the pneumatic absorbing member 10 is of the same construction as described in connection with Fig. 1, having a chamber 11 therein, and its walls of tapered form and provided with the oppositely disposed heads 18 and 20. In this form of the invention, cap plates 26 and 27 are respectively provided to seat over the heads 18 and 20 so as to retain and brace the side walls of the heads, thus preventing side sway of the member 10, but in this instance each cap plate is provided with a pair of integral lugs 28 and 30, extending in opposite directions and serving as a means for attaching the opposite ends of the expansible member to the fixed and movable parts of the vehicle. To that end, the respective pairs of lugs are apertured as shown at 31 and 32, as will be understood. For retaining the cap plates rigidly connected to the opposite ends of the member 10, stud bolts 33 and 34 are respectively employed in connection with the cap plates 26 and 27, and are threaded respectively into reinforcing discs 35 and 36, which are molded into the member 10 to serve to distribute compression stresses.

In Fig. 5 another structural form of the invention is shown in detailed section, and is for use where the construction of a vehicle makes it desirable to employ projecting fastening lugs, and therefore in this instance the retaining end cap plates of the pneumatic element are of the form shown at 37, which is provided with two diametrically oppositely disposed lugs 38 and 40 in the plane of the plate, each provided with a suitable opening 41 by which an end of the pneumatic member can be fixed directly to the flat surface of a part of the vehicle. A stud 42 is provided for retaining the cap plate 37 in place through its threaded engagement with a metal reinforcing disc 43, molded into the rubber of the member 10.

In Fig. 6, one application of the invention to a vehicle is shown employed in conjunction with an end of a vehicle spring 44, which extends parallel to the axle tube 45 of the vehicle, and through which the axle passes, as will be understood. Upon this tube 45, the pneumatic element 10 is mounted, having its upper end connected to the end of the spring by a lug construction, such for example as shown in Fig. 1, the lugs 14 being engaged by a suitable bolt 46 for pivotally holding the parts together. The lower end of the member 10 seats in and is secured to a clamping head 47, which is bolted to the axle tube 45 by means of the bolt 48, as will be understood.

In Fig. 7, an application of the shock absorber of the present invention is shown applied to rear ends respectively of the front spring 49 and rear spring 50 of a vehicle. The form shown in conjunction with the spring 49 employs the construction shown in Fig. 5, with the pneumatic member 10 fastened at its lower end by lugs 51 to the bolt 52 of the spring, and its opposite end is fastened by a cap and lug plate structure 53, as shown in detail in Fig. 5. The rear pneumatic member 10 is mounted between the spring 50 and the frame 54 by the type of construction shown in Fig. 3, though obviously that shown in Fig. 1 might also be employed.

In Fig. 8 another applied form of the invention is shown wherein the pneumatic member 10 is used in conjunction with opposite ends of both springs. Thus, for example, the front spring 55 is connected at its forward end by a bolt 56 to a lug construction of the shock absorber, and the opposite end of the spring is connected by a bolt 57 to a lug construction on the other shock absorbing member, and in this type of construction it is extremely necessary that danger of side sway be avoided, and to that end the forward end of the vehicle frame 58 is provided with a bell-like casing 60 in which the upper end of the shock absorber 10 is mounted and is thus held against lateral movement. Similarly, the opposite end of the frame 58 is provided with a second bell-form casing 61 enclosing the upper end of the rear shock absorbing element 10, the opposite end of which is connected by a bolt 62 with one end of the rear spring 63. Cap plates 64 and 65, of the type shown in Fig. 5, can be employed for respectively connecting the upper end of the shock absorber 10 employed with the rear of the spring 55 and the shock absorber 10 employed with the front of the spring 63, these plates 64 and 65 being suitably bolted to the frame 58, as will be understood.

In Figs. 9, 10 and 11 another form of the invention is shown which is applicable to use in a desirable construction, namely, where hinged or pivotal connection is to be eliminated at one end of a shock absorber. In this form the pneumatic member is substantially elliptical in longitudinal cross section, terminating at two opposite ends and semi-circular portions 70 which are connected by a flat-sided body portion 71 of substantially rectangular form. The end portions 70 have their respective apices 72 in the form of a thickened wall for added strength while the body portion 71 at one end is provided with a flat-sided relatively thick boss 73 and at the other with an inwardly projecting boss 74 of semi-circular contour, and this latter boss is preferably of less width than the boss 73, though both extend the full length of the body portion 71. The boss 73 is molded with a reinforcing plate 75 which in addition to giving strength where needed serves to form a rigid connection by means of studs 76 with an exterior base 77, from which attaching lugs 78 project for connecting this end of the shock absorber to the cooperating part, which may be either the end of the spring or a fixed part of the vehicle frame, though it will generally be the former. In order to prevent side sway, this base 77 is provided with two forks or prongs 80, projecting in the opposite direction from the lugs 78 and spaced apart a distance just sufficient to snugly receive the respective sides of the body 71. The latter is thus held firmly against a compressive action tending to expand it laterally but still allowing free movement towards and away from the base member 77. The boss 74 has molded therein a reinforced insert 81, of generally rectangular shape in plan but semi-circular in cross section, and in its embedded position has its curved side substantially concentric with respect to the curved surface of the boss 74 while its flat side is parallel to the outer surface of the body 71. This insert 81, in addition to furnishing a surface which is free from sharp edges and to strengthening the wall of the boss 74, serves to receive fastening bolts 82, which secure a bearing and attachment plate 83 to the body 71. This plate 83 provides a flat outer surface which is designed to seat against any convenient part to which this end of the shock absorber is to be attached, while its inner face 84 is convex in cross section, and therefore, under normal load conditions, has a relatively small area of its convex surface acting as a bearing surface with the plane surface of the body 71. Under load conditions, however, any force acting to compress the expansible member will reduce the distance between the plate 83 and the base 77 so that a greater area on the face of the body 71 is brought into contact with the convex plate 84, and the greater the force of the impact, the larger will be this increase in the contacting surface. This has the effect not only of distributing the applied forces more uniformly throughout the main body 71 of the expansible member but also allows the expansible member to compensate or self-adjust itself to the increase in the compressive action. The usual air valve 85 is provided, as will be understood.

In this form of the invention, therefore, it will be evident that the shock absorber is free to ride vertically up and down by sliding contact with the side elements 80, while these latter retain the shock absorber in proper position to carry out the desired function, and at the same time rigidly hold the sides thereof so that it is impossible for the expansible member to move laterally and thereby transmit a side sway to the parts controlled by it. Furthermore, by the employment of the attachment plate 83 it is possible to dispense with the apertured lugs or other connecting means which give a hinged or pivotal action between the shock absorber and the part to which that end of it is to be connected, though the plate 83 still provides for some freedom of movement of the expansible member with respect to it on account of the convexed lower surface. As has already been pointed out, this surface gives a self-adjustment of the expansible member and provides a definite means for automatically increasing the bearing surface as increments of applied force are added.

In the operation of the shock absorber of the present invention there exists a definite relation between the material of which the pneumatic element is formed and the contained air pressure, with the result that the two resilient means function together as a support for the weight of the vehicle. Thus, under normal smooth running conditions and under rest conditions the rubber or other material forming the flexible body of the absorber supplements the supporting action of the contained compressed medium. Under conditions of impact, however, the carrying capacity of the compressed air is in direct proportion to the volume of the hollow member, and as this volume is decreased under compression the pressure builds up so rapidly that the rubber or flexible member is proportionately relieved of the strain of carrying any weight beyond that for which its material is designed. This construction not only insures a long life to the material of the pneumatic element but functions to absorb the maximum impact initially so that the nearer the flexed spring comes to the end of its impact stroke the less is the magnitude of the impact. In consequence, the vehicle rides smoothly into its return normal position without rebound and without the necessity of snubbers or other additional or special type of shock absorber.

Having thus described my invention, I claim:

1. In a shock absorber, the combination of a pneumatic member of substantially elliptical form in cross section and having bosses molded respectively in two opposite sides, a base member fixed to one of said bosses, means for attaching said member to a cooperating part, a plate fixed to the opposite boss and arranged to be secured to another cooperating part, and means for varying the effective area of pressure between said plate and said pneumatic member.

2. In a shock absorber, the combination of a pneumatic member of substantially elliptical form in cross section and having bosses molded respectively in two opposite sides, a base member fixed to one of said bosses, means for attaching said member to a cooperating part, and a plate fixed to the opposite boss and arranged to be secured to another cooperating part, said plate having a convex face abutting said pneumatic member.

3. In a shock absorber, the combination of a pneumatic member of substantially elliptical form in cross section and having bosses molded respectively in two opposite sides, a base member fixed to one of said bosses, means for attaching said member to a cooperating part, a plate fixed to the opposite boss and arranged to be secured to another cooperating part, said plate having a convex face abutting said pneumatic member, and an insert molded into said pneumatic member and secured to said plate, said insert being arranged to distribute impact force.

4. In a shock absorber, the combination of a pneumatic member having bosses molded respectively in two opposite sides, a base member fixed to one of said bosses, means for attaching said member to a cooperating part, a plate fixed to the opposite boss and arranged to be secured to another cooperating part, and means for varying the effective area of pressure between said plate and said pneumatic member.

5. In a shock absorber, the combination of a pneumatic member having bosses molded respectively in two opposite sides, a base member fixed to one of said bosses, means for attaching said member to a cooperating part, a plate fixed to the opposite boss and arranged to be secured to another cooperating part, means for varying the effective area of pressure between said plate and said pneumatic member, and means to prevent lateral movement or side sway of said pneumatic member.

6. In a shock absorber, the combination of a pneumatic member having bosses molded respectively in two opposite sides, a base member fixed to one of said bosses, means for attaching said member to a cooperating part, a plate fixed to the opposite boss and arranged to be secured to another cooperating part, means for varying the effective area of pressure between said plate and said pneumatic member, and rigid lugs formed on said base and abutting opposite sides of said pneumatic member to prevent side sway thereof.

Signed at New Brunswick, in the county of Middlesex, State of New Jersey, this 19th day of Feby., 1924.

ALFRED WEILAND.